(12) United States Patent
Wang et al.

(10) Patent No.: US 7,724,534 B2
(45) Date of Patent: May 25, 2010

(54) STRAP HOLDING STRUCTURE

(75) Inventors: Jun Wang, Shenzhen (CN); Hsiao-Hua Tu, Taipei Hsien (TW); Peng-Jin Ge, Shenzhen (CN); Gang Yang, Shenzhen (CN); Yong-Hui Sun, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 704 days.

(21) Appl. No.: 11/616,845

(22) Filed: Dec. 27, 2006

(65) Prior Publication Data
US 2008/0061058 A1      Mar. 13, 2008

(30) Foreign Application Priority Data
Aug. 25, 2006   (CN) .................... 2006 1 0062299

(51) Int. Cl.
*H05K 7/16*   (2006.01)
(52) U.S. Cl. .................. 361/755; 16/223; 455/575.3
(58) Field of Classification Search ............... 361/755; 16/223; 455/575.1, 575.3
See application file for complete search history.

(56) References Cited

U.S. PATENT DOCUMENTS

| | | | | |
|---|---|---|---|---|
| 4,802,605 A | * | 2/1989 | Salmon et al. | 220/810 |
| 5,681,176 A | * | 10/1997 | Ibaraki et al. | 439/165 |
| 5,694,299 A | * | 12/1997 | Mori | 361/814 |
| 5,832,080 A | * | 11/1998 | Beutler et al. | 379/433.13 |
| 5,995,373 A | * | 11/1999 | Nagai | 361/755 |
| 6,650,547 B2 | * | 11/2003 | Hemmi et al. | 361/755 |
| 7,359,217 B2 | * | 4/2008 | Pan | 361/814 |

\* cited by examiner

*Primary Examiner*—Dameon E Levi
(74) *Attorney, Agent, or Firm*—Jeffrey T. Knapp

(57) ABSTRACT

A strap holding structure (200) for an electronic device (100), which includes a body (20), a cover (10). The body has a knuckle (22) formed at one end thereof. The knuckle has a middle board (226) formed therein. The cover has a barrel (12) formed at one end. The strap holding structure includes a latching element (30) and a strap holder (40). The latching element is attached to the cover at one end. The strap holder has a pole (424) at a first end of the strap holder. A groove (444) is circumferentially defined in an outer wall of the strap holder and two notches (442) are axially defined in the outer wall thereof. The strap holder is engaged in the knuckle and the barrel. The latching element is received in the groove and the middle board is received in the notches.

18 Claims, 6 Drawing Sheets

STRAP HOLDING STRUCTURE

BACKGROUND OF THE INVENTION

1. Field of the Invention

The present invention relates to strap holding structures and, particularly, to a strap holding structure for compact electronic devices such as portable telephones, portable computers, and so on.

2. Discussion of the Related Art

Compact electronic devices, such as portable telephones, internet wireless communicators, CD players, MP3 music players, mini electronic games, etc., have become more and more popular.

In a typical structure of holding electronic devices, it is inconvenient and uncomfortable for users to put these compact electronic devices into their pockets or hang them on their belts. Another conventional structure for holding electronic devices is a holder (i.e., an eyelet or the like) positioned in an electronic device so that a strap may be tied to the holder and hung around the neck. The holder is generally received in a receiving portion of the electronic device. When the holder has an axial force exerted on it, the holder can move axially off from the electronic device so that this structure might not hold the holder steadily in the receiving portion of the electronic device. In addition, this holder needs a screw to attach to the electronic device. Owing to the screw being positioned outside the electronic device, the screw will affect the appearance of the electronic device.

Therefore, a simple and convenient holding structure for carrying a decorative strap on a compact electronic device is desired in order to overcome the above-described problems.

SUMMARY

One embodiment of a strap holding structure is used for an electronic device, which includes a body and a cover. The body has a knuckle formed at one end thereof. The knuckle has a middle board formed therein. The cover has a barrel formed at one end. The cover is rotatably interconnected to the body. The strap holding structure includes a latching element and a strap holder. The latching element is attached to the cover at one end. The strap holder has a pole at a first end of the strap holder. A loop groove is circumferentially defined in an outer wall of the strap holder and two notches are axially defined in the outer wall thereof. The strap holder is engaged in the knuckle and the barrel. The latching element is received in the loop groove and the middle board is received in the notches.

Other advantages and novel features of the present strap holding structure will become more apparent from the following detailed description when taken in conjunction with the accompanying drawings.

BRIEF DESCRIPTION OF THE DRAWING

The components in the drawings are not necessarily drawn to scale, the emphasis instead being placed upon clearly illustrating the principles of the present strap holding structure. Moreover, in the drawings, like reference numerals designate corresponding parts.

DETAILED DESCRIPTION OF THE EMBODIMENT

Figure 1:
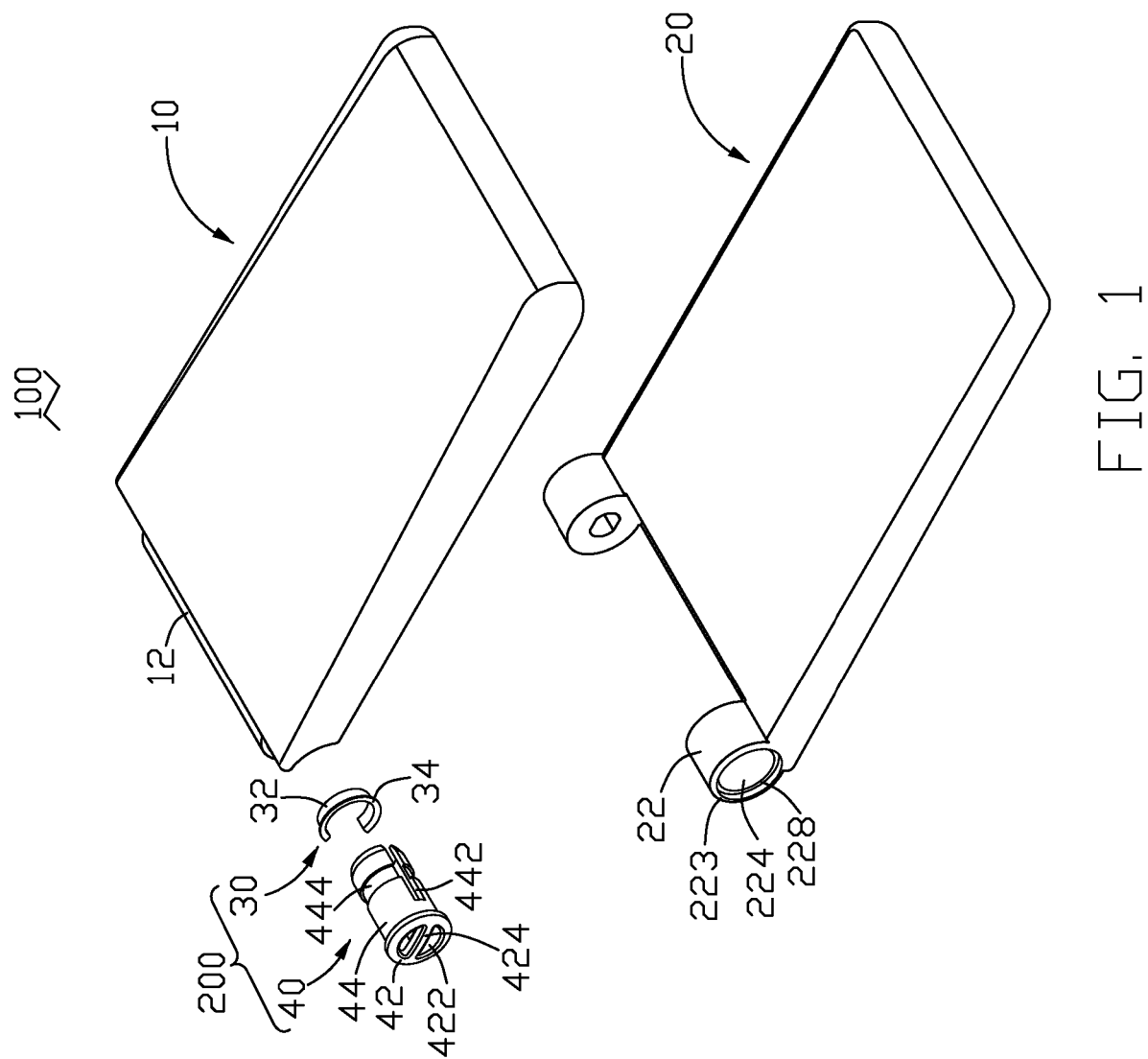
FIG. 1 is an exploded, isometric view of one embodiment of the electronic device with a strap holding structure.

Referring now to the drawings in detail, FIG. 1 shows a strap holding structure for an electronic device such as a mobile phone in accordance with one embodiment of the present invention. In an exemplary application, the strap holding structure is incorporated in a mobile phone 100.

Figure 2:
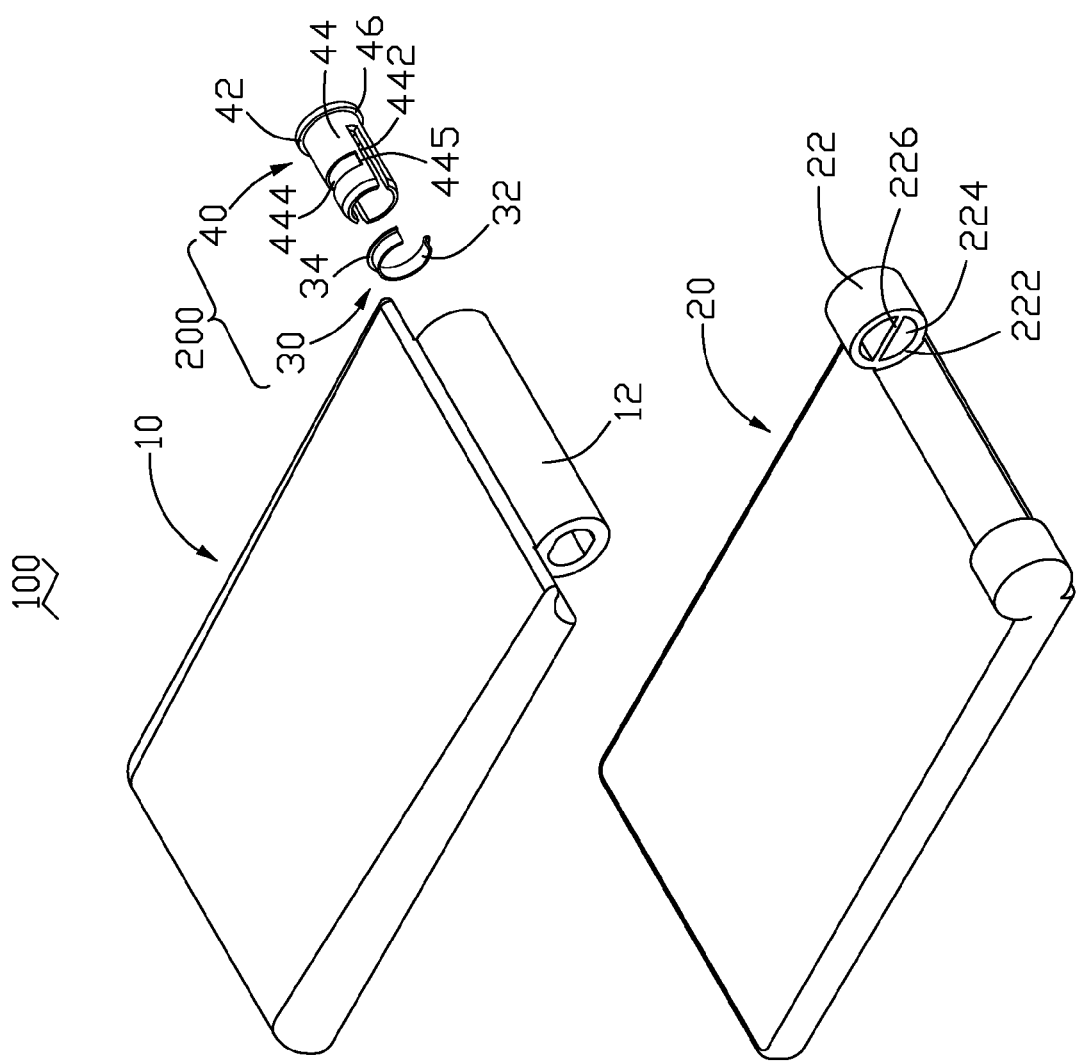
FIG. 2 is similar to FIG. 1, but viewed from another aspect.

Referring also to FIG. 2, the mobile phone 100 includes a cover 10, a main body 20 and a strap holding structure 200. The cover 10 and the main body 20 are rotatably interconnected through a hinge assembly for switching the mobile phone 100 between an in-use position and a closed position. The strap holding structure 200 may be attached to the cover 10 and the main body 20. The strap holding structure 200 includes a latching element 30 and a strap holder 40.

Figure 3:
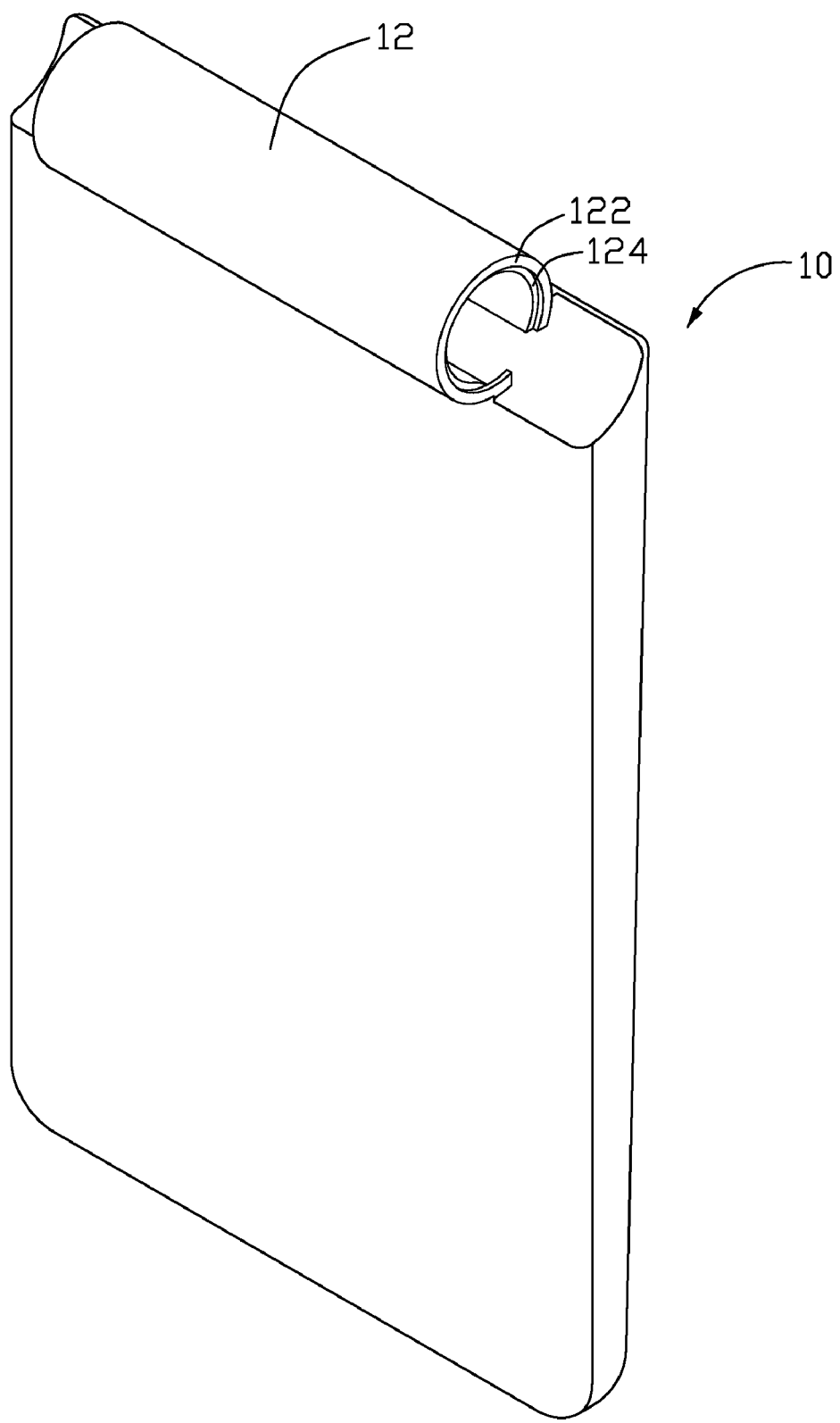
FIG. 3 is an enlarged, isometric view of the cover of FIG. 1.

Referring also to FIG. 3, the cover 10 has a hollow barrel 12 formed at one end thereof. The barrel 12 has an end wall 122 at a distal thereof. A C-shaped groove 124 is defined in the end wall 122. The main body 20 has a cylindrical knuckle 22 at one end thereof. The knuckle 22 is a hollow cylinder, and has a first wall 222 and an opposite second wall 223. The second wall 223 defines a stepped hole 228 therein. The knuckle 22 has an inner circumferential wall 224. A middle board 226 extends inwards from the first wall 222 to a middle portion of the knuckle 22 on the inner wall 224.

The latching element 30 is substantially C-shaped, and includes a main portion 32 and a flange portion 34 integrally formed at one end thereof. The size of the flange portion 34 is corresponding to that of the groove 124 so that the flange portion 34 may be received in groove 124 of the cover 10.

Figure 4:
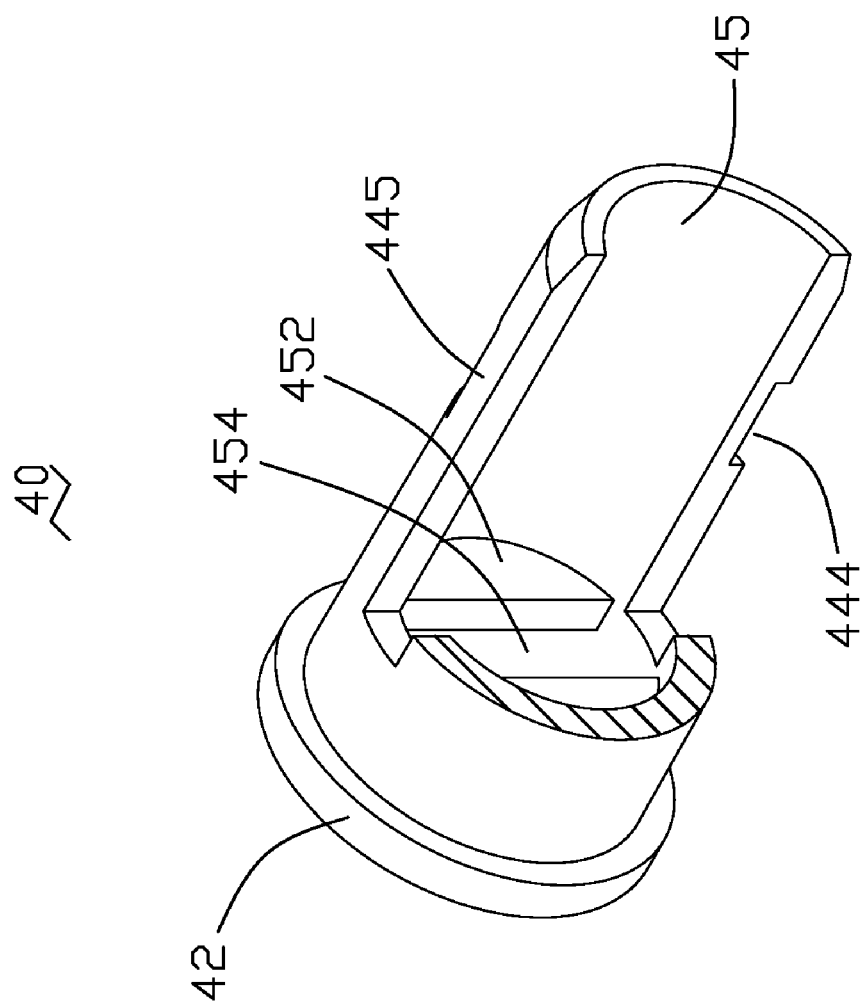
FIG. 4 is an enlarged, partially cross-sectional view of the strap holder of FIG. 1.

Referring to FIG. 4, the strap holder 40 is substantially a hollow cylinder. The strap holder 40 includes a primary portion 42 and a sleeve portion 44 integrally formed together. A diameter of the primary portion 42 is larger than that of the sleeve portion 44, thereby forming a step 46. One end of the primary portion 42 defines a recess 422. A pole 424 is positioned on the recess 422. The pole 424 and the recess 422 are integrally molded together. An outer circumferential wall of the sleeve portion 44 axially defines two rectangular notches 442 and circumferentially defines an arcuate groove 444. The two notches 442 are spaced 180 degrees apart. The arcuate groove 444 is formed by recessing the outer circumferential wall inwards, and is only defined in a part of a circumferential direction. Therefore, two spaced stoppers 445 are formed at two ends of the arcuate groove 444. The stoppers 445 are respectively positioned at two sides of a notch 442. A width of the arcuate groove 444 corresponds to that of the latching element 30 so that the latching ring 30 may be engaged in the arcuate groove 444. The sleeve portion 44 has an inner circumferential wall 45. The inner circumferential wall 45 symmetrically positions two partition boards 452. A molding hole 454 is defined between the two partition boards 452. The molding hole 454 is necessary to form the pole 424 of the strap holder 40.

Figure 5:
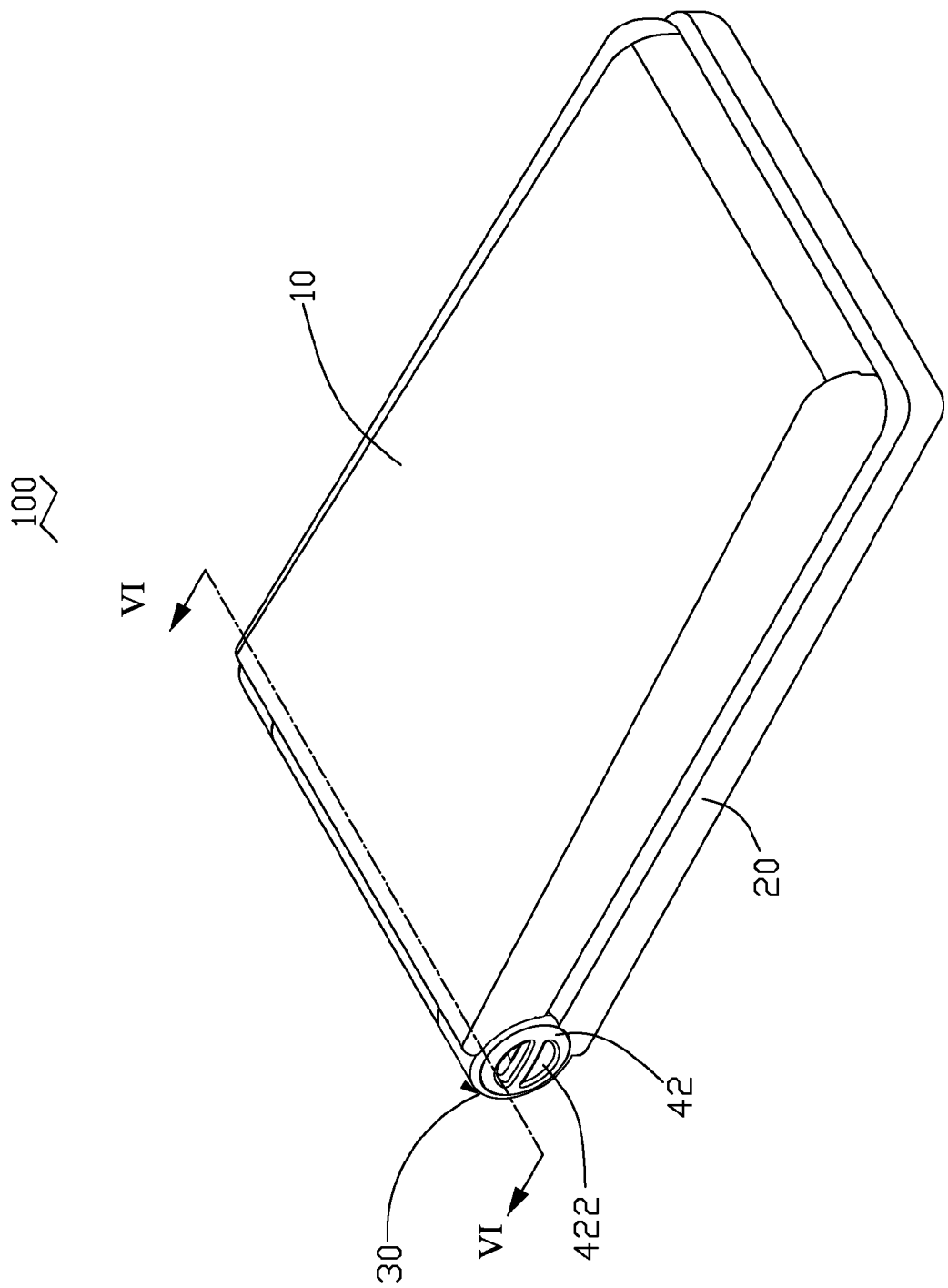
FIG. 5 is an assembled view of the electronic device shown in FIG. 1.
Figure 6:
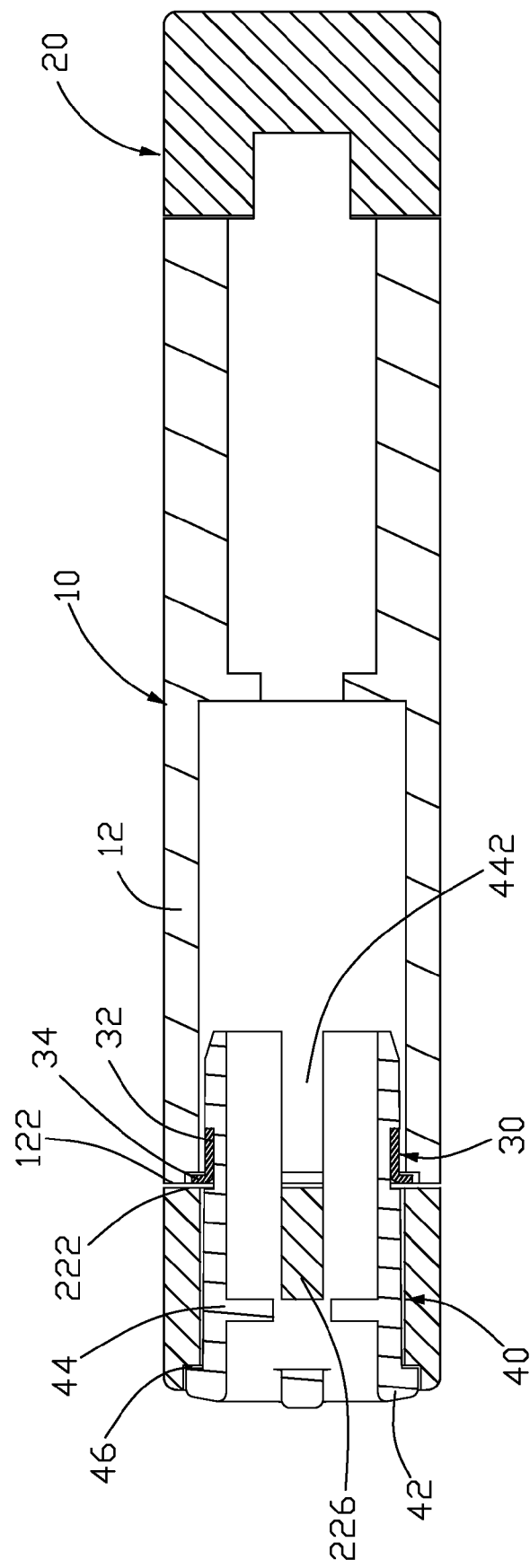
FIG. 6 is a cross-sectional view of the electronic device taken along the VI-VI line in FIG. 5.

In assembly, referring to FIGS. 5 and 6, firstly, the latching element 30 is received in the groove 124 of the barrel 12 of the cover 10. Then, the cover 10 with the latching element 30 is rotatably connected to the main body 20, and the first wall 222 of the main body 20 resists the end wall 122 of the cover 10. Accordingly, the latching element 30 is positioned between the main body 20 and the cover 10. After that, the strap holder 40 is inserted into the 22 and the notches 442 of the strap holder 40 are aligned with the middle board 226 of the knuckle 22, and the middle board 226 is slidably received in the notches 442. When a distal end of the strap holder 40 contacts with the latching element 30, the distal end of the strap holder 40 may be deformable so as to slide into the latching element 30. The strap holder 40 further continues to move axially until the latching element 30 is engaged in the arcuate groove 444. Two ends of the latching element 30 resist a corresponding stopper 445. The step 46 of the strap holder 40 is engaged in the stepped hole 228. Accordingly, the strap holder 40 is assembled into the mobile phone 100.

In use, when the strap holder 40 has an axial pulling force exerted on it, the strap holder 40 cannot move axially owing to the flange portion 34 of the latching element 30 being pressed against the first wall 222 of the main body 20. When the strap holder 40 has a circumferential torsion exerted on it, the strap holder 40 cannot rotate relative to the body 20 owing to the middle board 226 locked in the notches 422 of the strap holder 40. A strap may be tied to the pole 424 of the strap holder 40, and can be hung about the neck. The strap holding structure is simple and convenient for carrying an electronic device. In addition, a decorative strap also may be tied to the electronic device so as to ornament the electronic device.

As described above, the strap holding structure 200 is configured for assembling to an electronic device. A main advantage of the strap holding structure 200 is that the structure depends on its own structure to attach to the electronic device, and does not need a screw to attach the strap holder. This structure is very simple, and does not affect the appearance of the electronic device. Furthermore, the latching element 30 may prevent the strap holder 40 from being separated from the electronic device. In addition, the middle board 226 may be extended axially so that the middle board 226 may enclose the molding hole 454 of the strap holder 40. Therefore, the structure prevents dust entering into the electronic device.

The above-described strap holding structure 200 can be used with other kinds of mini electronic devices besides the mobile phone 100 illustrated, or with other kinds of apparatuses that need a strap holding structure.

It is believed that the present embodiment and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A strap holding structure for an electronic device which comprises a body and a cover, the body having a knuckle formed at one end thereof, the knuckle having a middle board formed therein; the cover having a barrel formed at one end, the cover rotatably connected to the body; the strap holding structure comprising:
   a latching element attached to the cover at one end thereof;
   a strap holder having a pole formed at an end thereof configured for a strap tied thereon, a groove circumferentially defined in an outer wall of the strap holder and two slots axially defined in the outer wall thereof, the strap holder engaged in the knuckle and the barrel, the latching element being received in the groove and the middle board being received in the slots.

2. The strap holding structure as claimed in claim 1, wherein the strap holder includes a primary portion and a sleeve portion integrally formed together, and a diameter of the primary portion is larger than that of the sleeve portion, thereby forming a step.

3. The strap holding structure as claimed in claim 2, wherein the primary portion defines a recess, the pole is positioned on the recess, and the pole and the primary portion are integrally molded together.

4. The strap holding structure as claimed in claim 2, wherein the sleeve portion has an inner circumferential wall, the inner circumferential wall symmetrically positions two partition boards, and a molding hole is defined between the two partition boards.

5. The strap holding structure as claimed in claim 1, wherein the two notches are spaced 180 degrees apart.

6. The strap holding structure as claimed in claim 1, wherein the groove is formed by recessing the outer circumferential wall inwards, and is defined in a circumferential direction.

7. The strap holding structure as claimed in claim 6, wherein two spaced stoppers are formed at two ends of the groove, and the stoppers are respectively positioned at two sides of one of the notches.

8. The strap holding structure as claimed in claim 1, wherein the latching element is C-shaped, and includes a main portion and a flange portion integrally formed at one end thereof.

9. The strap holding structure as claimed in claim 8, wherein the barrel of the cover defines a groove, the flange portion is received in the groove of the cover.

10. An electronic device comprising:
    a body having a hollow knuckle formed at one end thereof, the knuckle having a middle board formed therein;
    a cover having a barrel formed at one end, the cover rotatably connected to the body;
    a latching element attached to the barrel of the cover; and
    a strap holder having a pole at an end thereof, a groove circumferentially defined in an outer wall of the strap holder and two through slots axially defined in the outer wall thereof, the strap holder engaged in the knuckle and the barrel in that order, the latching element being received in the groove and abutting an end of the knuckle adjacent the barrel to prevent the strap holder axially withdrawing from the knuckle and the middle board being received in the notches to prevent the strap holder rotating relative to the knuckle.

11. The electronic device as claimed in claim 10, wherein the strap holder includes a primary portion and a sleeve portion integrally formed together, and a diameter of the primary portion is larger than that of the sleeve portion, thereby forming a step, the sleeve portion being sequentially inserted into the knuckle and the barrel and the step being axially stopped by an opposite end of the knuckle away from the barrel.

12. The electronic device as claimed in claim 11, wherein the primary portion defines a recess, a pole is positioned on the recess and configured for a strap tied thereon, and the pole and the primary portion are integrally molded together.

13. The electronic device as claimed in claim 12, wherein the sleeve portion has an inner circumferential wall, the inner circumferential wall symmetrically positions two partition boards, and a molding hole aligned with the pole is defined between the two partition boards for separating the pole from the sleeve portion.

14. The electronic device as claimed in claim 10, wherein the latching element is C-shaped, and includes a main portion and a flange portion integrally formed at one end thereof.

15. The electronic device as claimed in claim 14, wherein the barrel of the cover defines a groove in an inner wall thereof in a circumferential direction, the main portion passes over the groove into the barrel, and the flange portion is received in the groove of the cover and axially stopped by the inner wall.

16. A strap holding structure comprising:
a knuckle formed at one end of a first component, the knuckle having a board formed therein;
a barrel formed at one end of a second component, the second component rotatably interconnected to the first component;
a latching element attached to one of the first component and the second component at one end; and
a strap holder having a pole at an end of the strap holder, a groove circumferentially defined in an outer wall of the strap holder and two notches axially defined in the outer wall thereof, the strap holder engaged in the knuckle and the barrel, the latching element being received in the groove and the board being received in the notches, the strap holder having an inner circumferential wall, the inner circumferential wall symmetrically positioning two partition boards, and a molding hole defined between the two partition boards, and the middle board enclosing the molding hole.

17. The strap holding structure as claimed in claim 16, wherein the latching element is substantially C-shaped, and includes a main portion and a flange portion integrally formed at one end thereof.

18. The strap holding structure as claimed in claim 17, wherein the barrel of the second component defines a groove, and the flange portion is received in the groove of the second component.

* * * * *